US007092893B2

United States Patent
Megan et al.

(10) Patent No.: US 7,092,893 B2
(45) Date of Patent: Aug. 15, 2006

(54) CONTROL OF LIQUID PRODUCTION OF AIR SEPARATION PLANT NETWORK

(75) Inventors: Lawrence Megan, East Amherst, NY (US); David F. Lennox, North Tonawanda, NY (US); Paul F. Scharf, North Tonawanda, NY (US); Derin Adebekun, Pittsford, NY (US)

(73) Assignee: Praxair Technology, Inc., Danbury, CT (US)

( * ) Notice: Subject to any disclaimer, the term of this patent is extended or adjusted under 35 U.S.C. 154(b) by 295 days.

(21) Appl. No.: 10/352,037

(22) Filed: Jan. 28, 2003

(65) Prior Publication Data

US 2004/0148264 A1    Jul. 29, 2004

(51) Int. Cl.
G06F 9/44 (2006.01)
G06F 17/50 (2006.01)
G06F 11/34 (2006.01)
H04M 3/51 (2006.01)
G06G 7/48 (2006.01)

(52) U.S. Cl. ............... 705/7; 705/11; 703/6; 703/12
(58) Field of Classification Search ............ 705/1, 705/7, 8, 9, 10, 11, 400; 700/29, 95, 96; 703/2, 6, 7; 706/21
See application file for complete search history.

(56) References Cited

U.S. PATENT DOCUMENTS

| 3,891,836 A | 6/1975 | Lee | 235/151.12 |
| 4,940,079 A * | 7/1990 | Best et al. | 165/236 |
| 5,257,206 A * | 10/1993 | Hanson | 700/273 |
| 5,315,521 A | 5/1994 | Hanson et al. | 364/468 |
| 5,486,995 A | 1/1996 | Krist et al. | 364/149 |
| 5,521,814 A | 5/1996 | Teran et al. | 364/402 |
| 5,533,648 A * | 7/1996 | Read et al. | 222/108 |
| 5,912,424 A * | 6/1999 | Judkins et al. | 95/143 |
| 5,989,313 A * | 11/1999 | Mize | 95/10 |
| 6,269,286 B1 * | 7/2001 | Tse et al. | 700/271 |
| 6,701,201 B1 * | 3/2004 | Hegde et al. | 700/107 |
| 2002/0017113 A1 * | 2/2002 | Seiver et al. | 62/656 |
| 2002/0156663 A1 * | 10/2002 | Weber et al. | 705/7 |
| 2003/0018503 A1 * | 1/2003 | Shulman | 705/7 |
| 2003/0050819 A1 * | 3/2003 | Koenigbauer et al. | 705/8 |
| 2003/0233262 A1 * | 12/2003 | Chorely et al. | 705/8 |
| 2004/0204775 A1 * | 10/2004 | Keyes et al. | 700/29 |

FOREIGN PATENT DOCUMENTS

EP    508386 A2 *  10/1992

* cited by examiner

*Primary Examiner*—Igor N. Borissov
(74) *Attorney, Agent, or Firm*—David M. Rosenblum

(57) ABSTRACT

A method of controlling liquid and gaseous production within a plurality of air separation plants to produce and distribute gaseous and liquid products to a plurality of customers in which the electrical power costs involved in producing gaseous and liquid products is optimized to be at a minimum together with road shipping costs of liquid products by a real time optimization program.

7 Claims, 1 Drawing Sheet

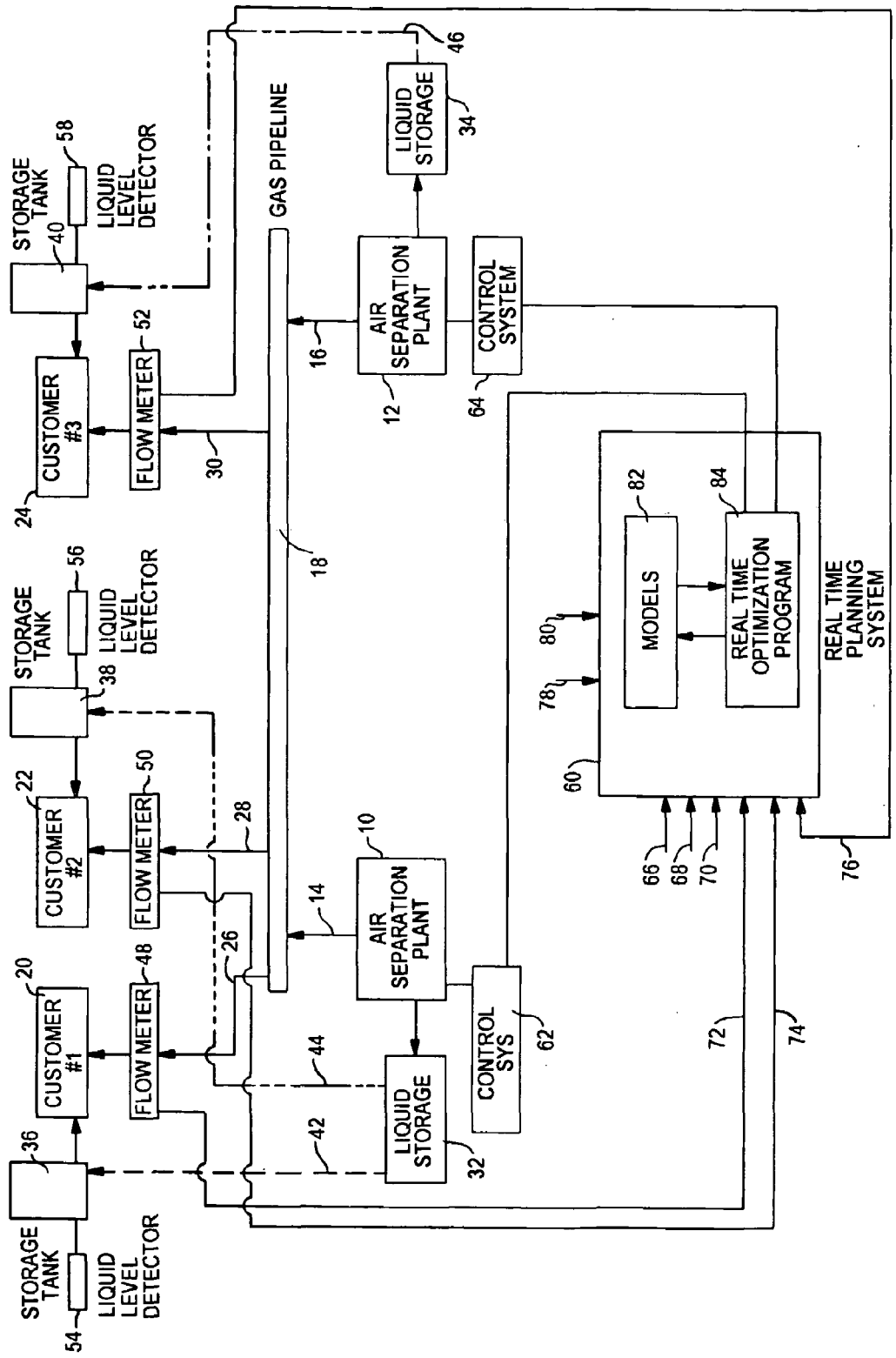

CONTROL OF LIQUID PRODUCTION OF AIR SEPARATION PLANT NETWORK

FIELD OF THE INVENTION

The present invention relates to a method of controlling liquid production of a plurality of air separation plants to produce and distribute liquid to a plurality of customers. More particularly, the present invention relates to such a method in which the liquid production is optimized by real time optimization techniques.

BACKGROUND OF THE INVENTION

Air separation plant networks include a number of pipeline distribution systems that connect multiple air separation plants to multiple customers. The air separation plants are known cryogenic distillation columns which typically separate air into oxygen and nitrogen. An auxiliary argon column can be included in such plants to also produce argon products. Liquid products, for instance, liquid oxygen and liquid nitrogen are the premium products in that energy must be expended in liquefaction and further, the liquid is typically distributed over the road by truck.

Determining production allocation of gaseous products feeding the pipeline networks is a complex decision in that the plants differ with respect to production capabilities, efficiencies, product mix and energy costs. The customer demand level is contractually based. Since the flow rate to the customer from any section of the pipeline can be correlated with the pressure measured within the pipeline, air separation production among the various plants is controlled to insure that the required pressure along pipeline sections is maintained.

Since the gas demand can change almost instantaneously, the first goal is to meet gas demand. The second goal is to insure a sufficient liquid inventory is maintained to meet local geographical liquid demand along with any liquid needed for pipeline backup.

While proper gas product allocation is limited to the plants feeding the physical pipeline, the proper decisions regarding liquid production must account for the broader liquid distribution network. Current liquid production decisions are made with the aid of modeling tools to determine the average liquid production requirements for each plant in a given region. The production target is based on current inventory, plant availability, expected energy costs and the region's expected customer demand. The decisions are reviewed daily or weekly and revised as necessary.

While the foregoing approach is adequate to make certain that customer demands are met, it does not necessarily guarantee that operating profits will be maximized. The decisions require a detailed knowledge of the performance and constraints of the plants and pipelines along with the knowledge of both the supplier and customer contracts. Furthermore, the people making the decisions are not available twenty-four hours a day to make and implement the required decisions.

Gas and liquid production needs drive the decisions around energy purchases. Air separation plants are driven by substantial amounts of electricity. In many cases, all or a portion of the required electricity must be purchased a day or more in advance. Once the power has been purchased for the next day, the operation of the particular plant must be done within the constraints of that purchase. Thus proper planning and deciding energy purchases is very important in optimizing the economics of the liquid distribution network.

As a result, allocation and distribution decisions are made on short notice, with limited information regarding plant capability and efficiencies. While reasonable decisions are made, it is difficult to make the best decision all the time and profits are compromised.

In a recently published United States Application, Publication Number 20020017113, a method is provided for automatically setting a target level for at least one air separation unit in a network of air separation units. The network is controlled by a control system which generates production target levels that are representative of a network production target level and the network energy usage level. The production target level is one that minimizes the sum of the energy usage levels. The problem with this type of control system is that merely minimizing the energy usage level does not minimize the cost of energy because the cost of energy over a network can vary from plant to plant.

As will be discussed, the present invention provides a method of controlling production within a network or a plurality of air separation plants to produce and distribute liquid for a plurality of customers in such manner as the cost of energy is minimized.

SUMMARY OF THE INVENTION

The present invention discloses a method of controlling liquid production within a plurality of air separation plants to produce and distribute liquid to a plurality of customers. In accordance with the method, demand data of liquid product demand and gaseous product demand is obtained for each of the customers over prespecified time intervals within a forecast period. Current atmospheric temperature pressure and humidity data can be continuously obtained for each of the air separation plants over the time intervals. The demand data and the current atmospheric temperature, pressure and humidity data, if obtained, are inputted into a real time planning system that is programmed with model programs and a real time optimization program. The model programs include plant model programs that can be responsive to the atmospheric temperature, pressure and humidity data to calculate electrical power data needed for each of the air separation plants to produce gaseous and liquid product slates from the air separation plants. The plant model programs contain production constraints for each of the air separation plants that limit the production of gaseous and liquid products therefrom. Power contract model programs are provided that are responsive to the electrical power data generated from the plant model programs to calculate cost data to produce the gaseous and liquid product slates for each of the air separation plants. Liquid distribution cost model programs are provided. These programs contain cost shipment data referable to road shipping costs of liquid products from each of the sites to individual customers or groupings of the customers to calculate transportation cost to distribute the liquid products to each of the customers within the groupings of the customers. Liquid storage constraints are provided for each of the sites.

The model programs and the real time optimization program are executed over the prespecified time intervals to obtain solutions from the real time optimization program through a mixed integer, non-linear optimization of optimized gaseous and liquid product slates for each of the air separation plants and for each of the prespecified time intervals over the forecast period in which a total of the cost of the electrical power and the liquid distribution cost over the forecast period are at a minimum while requirements for gaseous production are met as a hard constraint. The optimized gaseous and liquid product slates are implemented by controlling the air separation plants to produce gaseous and liquid products in accordance with the optimized gaseous and liquid product slates.

The plant model programs can be look-up tables containing data of power usage and gaseous and liquid production slates for each of the plurality of air separation plants. The power usage and the liquid production can be periodically recorded for each of the air separation plants and used to generate error corrections for the look up tables.

The inputting of the demand data into the real time planning system can be over a LAN system. Liquid demand for each of the customers can be determined by periodically measuring liquid level and liquid storage tanks of the plurality of customers and recording the liquid delivered to the plurality of customers over the forecast. The result is divided by the number of prespecified time intervals within the forecast. The gaseous demand can be determined by continually measuring the gas usage of the plurality of customers and then time averaging the data for a particular time interval. For instance, the gas usage for hour number three of the forecast period can be averaged over the last month of usage. This averaging can be done manually or by transmitting the raw hourly data of the gaseous usage to the real time planner through a LAN system to make the actual calculation.

The optimized gaseous and liquid product slates can be electronically transmitted to control systems of the air separation plants. The prespecified time intervals can be 1 hour and the forecast period can be 7 days.

BRIEF DESCRIPTION OF THE DRAWING

While the specification concludes with claims distinctly pointing out the subject matter that applicants regard as their invention, it is believed that the invention will be better understood when taken in connection with the accompanying drawings in which the sole figure is a schematic diagram of the control to be accorded to air separation plants in accordance with the present invention.

DETAILED DESCRIPTION

With reference to the figure, air separation plants 10 and 12 are illustrated as feeding gaseous products 14 and 16 to a pipeline 18. The gaseous products, oxygen and nitrogen are drawn by customers 1, 2 and 3 designated by reference numerals 20, 22 and 24, respectively, from outlet lines 26, 28 and 30. Outlet lines 26, 28 and 30 might encompass multiple lines for each product to be used, namely gaseous oxygen and gaseous nitrogen.

Air separation plants 10 and 12 are known cryogenic distillation plants that have compressors to compress incoming, filtered air to a higher pressure, heat exchangers to cool the incoming air to at or near its dew point and higher and lower pressure distillation columns to refine the air into nitrogen and oxygen products which are used to cool the incoming air. Also conventionally, refrigeration is added to compensate for heat leakage and warm end heat losses by way of conventional turboexpanders which can be used to drive the compressors by way of electrical generators. The higher pressure columns create an ascending vapor phase becomes evermore rich in the more volatile components of the air, mainly nitrogen. The tower overhead of such higher pressure column is condensed by a condenser reboiler linked to the lower pressure column to create a descending liquid phase that becomes ever more rich in the lower volatility components, principally oxygen. The tower overhead can be further refined in the lower pressure column, operating at a lower pressure to create a high purity nitrogen product and a column bottoms that would constitute a liquid oxygen product that can either be stored as liquid or vaporized by heat exchange with the incoming air stream and sent to a gas pipeline. The products of the air separation are routed to the heat exchanger to cool the incoming air. Where substantial quantities of liquid oxygen or nitrogen is desired beyond what can be produced by turboexpansion, nitrogen liquefiers can be incorporated into the plant and the liquid product can be stored on site in storage tanks which are designated in the figure as liquid storage 32 and 34. The gaseous products are sent to gas pipeline 18 via lines 14 and 16. For separate liquid nitrogen and liquid oxygen products separate pipelines would be used along with separate outlet lines from air separation plants 10 and 12.

As may be appreciated, the foregoing description of air separation plants 10 and 12 and the illustration of a single gas pipeline 18 are shown only for purposes of explanation. The present invention contemplates, for instance, several air separation plants being located within a single site and potentially several gas pipelines, or a site with one or more ASP's feeding a single pipeline customer or producing only liquid products.

The liquid products from liquid storage 32 and 34 are transported over road by tanker trucks to liquid storage tanks 36, 38 and 40 of customers 20, 22 and 24, respectively. The road mileage to the customer varies and therefore the cost. This over the road transportation linkage is shown by dashed lines 42, 44 and 46.

Although shown as single customers and storage tanks, for instance, customer 20 and storage tank 36 might be a series of customers in a small geographical area or industrial park, each having its own storage tanks.

The gaseous product being drawn by customers 20, 22 and 24 from gas pipeline 18 can be metered by flow meters 48, 50 and 52. Liquid levels within storage tanks 36, 38 and 40 are routinely monitored by liquid level detectors 54, 56 and 58. Gas usage can be monitored on an ongoing basis from flow meters 48, 50 and 52. Liquid usage can be monitored by monitoring the difference in liquid level within the storage tanks and the amount of liquid being added to the storage tanks by overland delivery along routes 42, 44 and 46. For instance, if a storage tank, such as 36 is completely filled with liquid oxygen on one delivery and the liquid level has dropped to one half of the tank's capacity customer usage by customer 20 of liquid oxygen can be readily determined. It is possible that several deliveries can be made during a week.

Air separation plants 10 and 12 must at all costs meet the gas supply contracts of customers 20, 22 and 24 and thus must continuously supply sufficient gas to pipeline 18. If gas pipeline demand exceeds gas production capacity, liquid from storage tanks 32 and 34 is vaporized and put into the pipeline to supplement gas production through lines. After the gas requirements are met, liquid requirements are met. However, the liquid is a value added product in that energy must be expended from the liquefaction and transportation and there exists only a finite amount of liquid storage 32 and 34 for any air separation plant site for air separation plants 10 and 12.

Each air separation plant 10 and 12 continually consumes electrical energy, principally through its compressors that are used to compress the incoming air. Since each air separation plant 10 and 12 have only a finite capacity to make gaseous and liquid products it would appear to be a simple matter to schedule gaseous and liquid production by simply minimizing the energy usage by using and routing liquid by the most direct routes possible. What complicates the scenario is that the electrical power costs for each plant can differ depending upon the negotiated electrical supply contract. Moreover, the cost of electrical power will vary during the day. Thus, the variables to be considered for delivering gas and liquid products are: the costs involved in electrically powering the air separation plants; the time of day; the season in that the efficiency of air separation plant varies in accordance with the seasons and the atmospheric condition; the variation of ASP efficiency with product slate; and the shipping costs of liquid to the customer based upon their demand. Complicating the picture even further is that each air separation plant only has a limited capacity to store liquid product and the customer usage of liquid product is not necessarily constant. If liquid is produced at a given ASP when the price is high but the liquid is not needed immediately because of customer demand, and the liquid could be produced later at a lower cost, this represents a financial loss for the producer.

In accordance with the present invention, the distribution of gaseous and liquid products is controlled by a real time planning system 60. Real time planning system 60 functions over a forecast period, preferably a week and executes over a prespecified time interval, preferably 1 hour, to provide an optimized forecast of gaseous and liquid production of each air separation plants 10 and 12 over each hour of the forecast period to minimize the total cost of operation over the forecast period. Gaseous and liquid production of each air separation plant 10 and 12 is referred to in the art as a product slate which will change, perhaps on an hourly basis, as controlled by control systems 62 and 64 of air separation plants 10 and 12. The optimization is calculated on the basis of the previous gas and liquid usage of each customer 20, 22 and 24.

As a first step, the average hourly usage of liquid must be determined. This can be approximated in a variety of ways. One way is to measure the liquid usage of each of the customers by measuring levels by level detectors 54, 56 and 58 and comparing them with liquid deliveries over the previous month and then dividing the liquid usage by the hours in a month to obtain the liquid usage on an hourly basis. Actual hourly usage of gas products can be monitored by flow meters 48, 50 and 52 and stored. As indicated above, the gas usage by a particular customer can be averaged over each time interval for a past period, for instance, a month. This calculation can be computed in the real time planning system 60 and stored. The liquid demand and gaseous product demand data determined in a manner outlined above, is introduced as inputs 66, 68 and 70 for customers 20, 22 and 24, respectively. Additionally, hourly gaseous consumption data from flow meters 48, 50 and 52 can be automatically inputted as data into real time planning system 60 via inputs 72, 74 and 76, respectively. As may be appreciated, liquid level detectors 54, 56 and 52 could be directly linked to real time planning system 60 by way of a LAN system. Additionally, atmospheric temperature, pressure and humidity data, on an hourly basis, the prespecified time interval being used in this example, can be inputted as inputs 78 and 80 for the sites containing air separation plants 10 and 12.

The real time planning system, in addition to having storage capacity, contains a series of models 82 that interact with the real time optimization program 84. There are many real time optimization programs, however, one that can be used is a program entitled, "RTO+" which can be obtained from MDC Technology of Teesside, United Kingdom. Real time optimization program utilizes optimization technology known as mixed integer non-linear programming. Real time optimization program 84 and models 82 interact as will be discussed hereinafter.

Models 82 consists of plant model programs that are responsive to atmospheric temperate, pressure and humidity data. These models calculate electrical power data needed for each air separation plant 10 and 12 to produce gaseous and liquid products slates. They also contain hard constraints for each of the air separation plants 10 and 12 that limit the production of gaseous and liquid products. Air separation plants are typically of a finite size and are only capable of making a certain amount of gaseous nitrogen and gaseous oxygen and liquid nitrogen and liquid oxygen. As stated previously, a further constraint consists of the amount of liquid storage 32 and 34 on each site. The plant models can be quite sophisticated and can actually model distillation trays or the distillation occurring within structured packing within each tower. For instance, the models can have detailed first principle models that model each unit operation. Correlation based models are also possible that use polynomial fits to represent primarily compressor performance and product recovery rates. At a lower level of sophistication, the models can consist of look-up tables in which electrical power usage is correlated with the production involved in producing each gaseous and liquid product slate. Such looks up tables can themselves be seasonably adjusted. This look-up table concept can be adjusted by gathering data of the power generation for a particular product slate comparing it with that stored up in the look-up table in generating an error factor that corrects the difference and thus updates the look-up table.

In addition, there are power contract model programs that are responsive to the electrical power data to calculate the cost data to produce the gaseous and liquid product slates for each of the air separation plants 10 and 12. These are algorithms that relate to the electrical power contracts.

Liquid distribution cost model programs are provided that contain cost shipment data preferably to road shipping costs of liquid products from each of the sites to customers, for instance customers or customer groupings of customers 20, 22 and 24 to calculate transportation costs to distribute liquid products to each of the customers and where applicable groupings of customers.

As stated previously, the real time planning system 80 executes on an hourly basis. On the first execution estimates are obtained for the current gaseous and liquid production. These estimates can be current gaseous usage as measured by flow meters 50 and 52. Other possibilities are to set the program with the minimum product or maximum product slates that can be produced by each plant. Models 82 determine power usage data which then gets fed into electrical power usage models to determine cost data. Added to this is shipping cost data for the liquid products and a calculation is made for the total cost involved over the forecast period.

As stated previously, gaseous production demand must at all costs be satisfied and therefore represents a hard constraint for the real time optimization program 84. The program checks to make certain that gaseous production requirements are first met, even at the sacrifice of liquid production. Production slates of plants 10 and 12 are thereby adjusted accordingly. Real time optimization program 84 then will adjust each variable in turn, for instance, hourly gaseous nitrogen production from plant 10, to determine whether the cost of production has increased or decreased.

The program will continually undergo iterations until the production costs are at a minimum. The minimum is determined when a predetermined factor of minimum change of the costs between each iteration, for instance 10 dollars is reached. When this is done real time optimization program 84 transmits desired liquid and gaseous production slates to each control system 62 and 64.

An added advantage of real time planning system 84 is that it allows forecasts to be made while taking into account real time variations and demand, for instance a customer shut down. For instance, real time planning system 84 and the real time optimization program in particular can incorporate the addition of a manual adjustment of the data, for instance, the ability to set particular hours of liquid and gaseous demand for a particular customer at zero when it is known such customer will not be in operation.

The following is a calculated example in tabular form illustrating the various inputs and the type of results that would be obtainable for real time planning system 84. It is simplified in that the forecast period is three hours and the time interval is an hour. Moreover, two plants are considered, Plant 1 and Plant 2 that serve two customers, Customer A and Customer B. Either plant can ship liquid to either customer. To simplify the example it is assumed that the total liquid product over the three hours from a given plant must be shipped, but does not have to be shipped in the hour of production. A more sophisticated model would include liquid inventory for each site and would add constraints to keep the tank levels between user specified limits. Unlimited trucking resources are assumed given that there are no limits on how much liquid can be shipped in a given hour.

The following is a table of plant models in the form of simplified look up tables in which the columns A and B relating to total plant power are in megawatts ("MW") per thousand cubic feet per hour at standard temperature and pressure ("MCFH"). The gas production and liquid production in this table are in units of "MCFH".

| Plant Models Plant Power = A* (Gas produced) + B* (Liquid produced) | | | | | |
|---|---|---|---|---|---|
| | A | B | Maximum Gas Production | Maximum Liquid Production | Maximum Gas + Liquid |
| Plant 1 | 0.01 | 0.02 | 300 | 100 | 300 |
| Plant 2 | 0.02 | 0.02 | 400 | 100 | 400 |

The following is the assumed distribution costs:

| Distribution Costs | | |
|---|---|---|
| | Customer A | Customer B |
| Plant 1 | 1 | 2 |
| Plant 2 | 2 | 1 |

Distribution Cost in dollars/thousand cubic feet

The following table represents the forecast in gaseous and liquid demand data for each customer A and customer B along with the forecasted power costs for plant 1 and plant 2. Gas demands are in units of MCFH and the liquid demands are in MCF:

| Forecasts | | | |
|---|---|---|---|
| | Total for 3-hour time horizon | | |
| Customer A Liquid Demand | 300 | | |
| Customer B Liquid Demand | 150 | | |
| | Hour 1 | Hour 2 | Hour 3 |
| Customer A Gas Demand | 200 | 200 | 200 |
| Customer B Gas Demand | 300 | 300 | 100 |
| Plant 1 power cost (dollars/MW) | 30 | 30 | 30 |
| Plant 2 power cost (dollars/MW) | 30 | 25 | 20 |

The results are presented in the tables below, entitled, "Case I Results" and "Case II Results". Case I results are the starting points for the real time optimization program. These starting points were arbitrary production rates over the forecast period. The computation was completed by optimizing production and distribution to produce the highest costs. A more optimal starting point would be arrived at by using the current production. The Case II Results are the final optimized results for each hour over the three hour period. These final optimized results would be implemented in Plants 1 and 2. If there were changes in the forecast data at the conclusion of hour 1, the program would be run again. In both Case I and Case II results constraints are checked as they would be in a practical application of the present invention. In Case II, results of optimized liquid and gaseous production are illustrated in which costs are minimized over the forecast period. Gas and liquid produced are in units of MCFH and MCF, respectively. Liquid shipped to customers is in units MCF.

| Case I Results Computed Liquid and Gas Production and Liquid Shipment | | | |
|---|---|---|---|
| | Hour 1 | Hour 2 | Hour 3 |
| Plant 1 | | | |
| Gas Produced | 200 | 200 | 0 |
| Liquid Produced | 0 | 50 | 100 |
| Liquid Shipped to Customer A | 0 | 0 | 0 |
| Liquid Shipped to Customer B | 150 | 0 | 0 |
| Plant 2 | | | |
| Gas Produced | 300 | 300 | 300 |
| Liquid Produced | 100 | 100 | 100 |
| Liquid Shipped to Customer A | 0 | 0 | 300 |
| Liquid Shipped to Customer B | 0 | 0 | 0 |
| Constraint Check Plant 1 | | | |
| Maximum Gas Limit | 300 | 300 | 300 |
| Gas Produced | 200 | 200 | 0 |
| Maximum Liquid Limit | 100 | 100 | 100 |
| Liquid Produced | 0 | 50 | 100 |
| Maximum Gas + Liquid Limit | 300 | 300 | 300 |

Case I Results
Computed Liquid and Gas Production and Liquid Shipment

|  | Hour 1 | Hour 2 | Hour 3 |
|---|---|---|---|
| Gas + Liquid Produced | 200 | 250 | 100 |
| Total Liquid Produced | 150 | | |
| Total Liquid Shipped | 150 | | |
| Plant 2 | | | |
| Maximum Gas Limit | 400 | 400 | 400 |
| Gas Produced | 300 | 300 | 300 |
| Maximum Liquid Limit | 100 | 100 | 100 |
| Liquid Produced | 100 | 100 | 100 |
| Maximum Gas + Liquid Limit | 400 | 400 | 400 |
| Gas + Liquid Produced | 400 | 400 | 400 |
| Total Liquid Produced | 300 | | |
| Total Liquid Shipped | 300 | | |
| Delivery and Production Data | | | |
| Customer A Liquid | | | |
| Total Required | 300 | | |
| Total Delivered | 300 | | |
| Customer B Liquid | | | |
| Total Required | 150 | | |
| Total Delivered | 150 | | |
| Total Gas Demand | | | |
| Total Required | 500 | 500 | 300 |
| Total Delivered | 500 | 500 | 300 |
| Cost Calculation | | | |
| Plant 1 Power Consumption (MW) | 2.0 | 3.0 | 2.0 |
| Plant 2 Power Consumption (MW) | 8.0 | 8.0 | 8.0 |
| Plant 1 Power Cost (Dollars) | 60.0 | 90.0 | 60.0 |
| Plant 2 Power Cost (Dollars) | 240.0 | 200.0 | 160.0 |
| Plant 1 Distribution Cost (Dollars) | 300.0 | 0.0 | 0.0 |
| Plant 2 Distribution Cost (Dollars) | 0.0 | 0.0 | 600.0 |
| Total Cost per hour (Dollars) | 600.0 | 290.0 | 820.0 |
| Total Cost (Dollars) | 1710.0 | | |

Case II Results
Computed Liquid and Gas Production and Liquid Shipment

|  | Hour 1 | Hour 2 | Hour 3 |
|---|---|---|---|
| Plant 1 | | | |
| Gas Produced | 200 | 200 | 200 |
| Liquid Produced | 100 | 100 | 100 |
| Liquid Shipped to Customer A | 300 | 0 | 0 |
| Liquid Shipped to Customer B | 0 | 0 | 0 |
| Plant 2 | | | |
| Gas Produced | 300 | 300 | 100 |
| Liquid Produced | 0 | 50 | 100 |
| Liquid Shipped to Customer A | 0 | 0 | 0 |
| Liquid Shipped to Customer B | 0 | 150 | 0 |
| Constraint Check | | | |
| Plant 1 | | | |
| Maximum Gas Limit | 300 | 300 | 300 |
| Gas Produced | 200 | 200 | 200 |
| Maximum Liquid Limit | 100 | 100 | 100 |
| Liquid Produced | 100 | 100 | 100 |
| Maximum Gas + Liquid Limit | 300 | 300 | 300 |
| Gas + Liquid Produced | 300 | 300 | 300 |
| Total Liquid Produced | 300 | | |
| Total Liquid Shipped | 300 | | |
| Plant 2 | | | |
| Maximum Gas Limit | 400 | 400 | 400 |
| Gas Produced | 300 | 300 | 100 |
| Maximum Liquid Limit | 100 | 100 | 100 |
| Liquid Produced | 0 | 50 | 100 |
| Maximum Gas + Liquid Limit | 400 | 400 | 400 |
| Gas + Liquid Produced | 300 | 350 | 200 |
| Total Liquid Produced | 150 | | |
| Total Liquid Shipped | 150 | | |
| Delivery and Production Data | | | |
| Customer A Liquid | | | |
| Total Required | 300 | | |
| Total Delivered | 300 | | |
| Customer B Liquid | | | |
| Total Required | 150 | | |
| Total Delivered | 150 | | |
| Total Gas Demand | | | |
| Total Required | 500 | 500 | 300 |
| Total Delivered | 500 | 500 | 300 |
| Cost Calculation | | | |
| Plant 1 Power Consumption (MW) | 4.0 | 4.0 | 4.0 |
| Plant 2 Power Consumption (MW) | 6.0 | 7.0 | 4.0 |
| Plant 1 Power Cost (Dollars) | 120.0 | 120.0 | 120.0 |
| Plant 2 Power Cost (Dollars) | 180.0 | 175.0 | 80.0 |
| Plant 1 Distribution Cost (Dollars) | 300.0 | 0.0 | 0.0 |
| Plant 2 Distribution Cost (Dollars) | 0.0 | 150.0 | 0.0 |
| Total Cost per Hour (Dollars) | 600.0 | 445.0 | 200.0 |
| Total Cost (Dollars) | 1245.0 | | |

If the Case I data is analyzed and compared with the Case II data, it is readily apparent that the optimized Case II came in at a lower total cost.

While the present invention has been discussed in reference to preferred embodiments, as will occur those skilled in the art, numerous changes, additions and omissions may be made without departing from the spirit and the scope of the present inventions.

What is claimed is:

1. A method of controlling liquid production within a plurality of air separation plants situated at sites having different locations to produce and distribute liquid to a plurality of customers; said method comprising:

obtaining demand data of liquid product demand and gaseous product demand for each of said customers over prespecified time intervals within a forecast period;

inputting said demand data into a real time planing system programmed with model programs and a real time optimization program;

said model programs including:

plant model programs to calculate electrical power data needed for each of said air separation plants to produce gaseous and liquid product slates from said air separation plants and containing production constraints for each of said air separation plants that limit the production of gaseous and liquid products therefrom;

power contract model programs responsive to the electrical power data to calculate cost data to produce the gaseous and liquid product slates for each of the air separation plants; and liquid distribution cost model programs containing cost shipment data referable to road shipping costs of liquid products from each of said sites to individual or groupings of said customers to calculate transportation costs to distribute the liquid products to each of said customers within the groupings of said customers; and liquid storage constraints for each of said sites;

executing said model programs and said real time optimization program over said prespecified time intervals to obtain solutions from said real time optimization program through mixed integer nonlinear optimization of optimized gaseous and liquid product slates for each of said air separation plants for each of said prespecified time intervals over the forecast period in which a total of said cost of the electrical power and said liquid distribution costs over the forecast period are at a minimum while requirements for gaseous production are met as a hard constraint; and implementing said optimized gaseous and liquid product slates by controlling the air separation plants to produce gaseous and liquid products in accordance with the optimized gaseous and liquid product slates.

2. The method of claim 1, further comprising:

continually obtaining current atmospheric temperature, pressure, and humidity data for each of said air separation plants over said time intervals; and the plant model programs being responsive to said atmospheric temperature, pressure and humidity data to calculate said electrical power data.

3. The method of claim 1, wherein said plant model programs are look-up tables containing data of power usage and gaseous and liquid production slates for each of said plurality of air separation plants.

4. The method of claim 2, wherein power usage and liquid production are periodically recorded for each of said air separation plants and used to generate error corrections.

5. The method of claim 1, wherein said liquid demand of each of said customers is determined by periodically measuring liquid level in liquid storage tanks of said plurality of customers, recording the liquid delivered to said plurality of customers over the forecast period and dividing the result by the number of prespecified time intervals within the forecast period and the gaseous demand is determined by continually measuring the gaseous usage of said plurality of customers and transmitting the gaseous usage to the real time planner through a LAN.

6. The method of claim 1, wherein said optimized gaseous and liquid product slates are electronically transmitted to control systems of said air separation plants.

7. The method of claim 1, wherein said prespecified time intervals are one hour and said forecast period is seven days.

* * * * *